Nov. 30, 1943.  W. A. RAY  2,335,358
THERMOCOUPLE STRUCTURE
Filed June 17, 1940
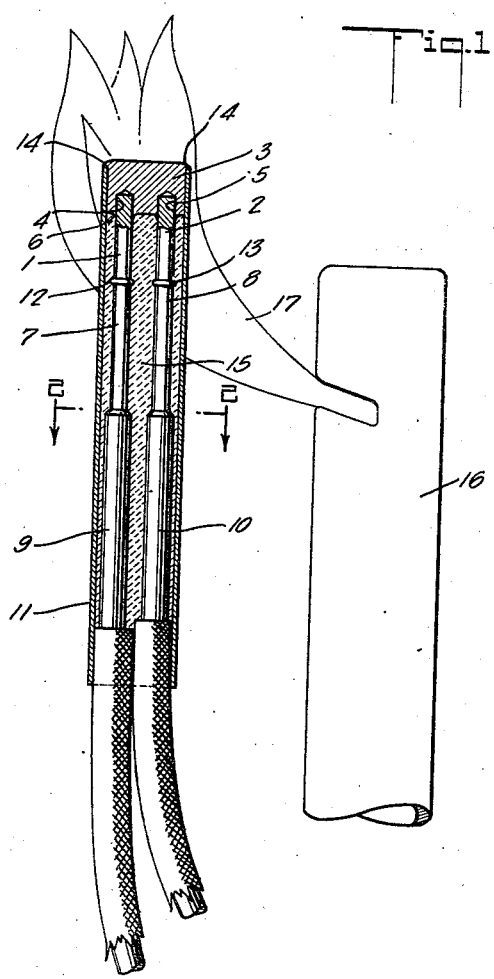
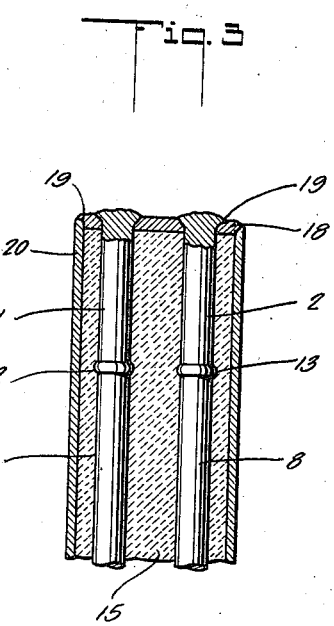
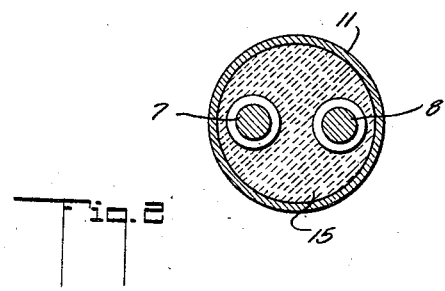
INVENTOR
William A. Ray
BY John Flam
ATTORNEY Patented Nov. 30, 1943

2,335,358

UNITED STATES PATENT OFFICE 2,335,358

THERMOCOUPLE STRUCTURE

William A. Ray, Glendale, Calif.

Application June 17, 1940, Serial No. 341,006

2 Claims. (Cl. 136—4)

This invention relates to a thermocouple structure, and especially to one adapted to be directly subjected to a flame, such as of a pilot burner.

Thermocouples of this general character are known. They employ, for the thermocouple elements, conductors made from dissimilar metals or alloys. If these elements be joined together, an electric current may be generated by maintaining the junction at an elevated temperature with respect to the free ends of the conductors. These ends may be joined to leads for facilitating the connection of the thermocouple into an appropriate circuit. The junction that is adapted to be heated is conveniently designated as the "hot" junction; and the junctions between the thermocouple elements and the leads are conveniently designated as the "cold" junctions. Since the theory and mode of operation of thermocouples of this character are now well understood, further explanation thereof is unnecessary.

Since the thermocouple hot junction is however subjected to a very high flame temperature, care is taken to provide elements capable of withstanding these temperatures for indefinite periods without danger of harmful corrosion or disintegration. Accordingly alloys such as Chromel and Copel, having the desired qualities, are often used. These alloys are quite expensive and for that reason they are utilized as economically as possible.

It is one of the objects of this invention to make it possible to utilize very short lengths of these expensive alloys and yet to ensure that a suitable temperature differential is maintained between the hot and cold junctions.

When using such short lengths of the thermocouple conductors, care must be taken that, due to transfer of heat from the hot junction or from the flame, the cold junctions are adequately maintained at a lower temperature than the hot junction, in spite of the fact that the junctions are quite close together. It is another object of this invention to make it possible to accomplish these results by the aid of a simple, inexpensive construction.

It is advantageous to subject the hot junction to as much of the flame as possible with little effect upon the cold junctions. When the thermoelectric conductors are short, this requirement is obviously difficult of attainment. By the aid of the present invention, the hot junction is supplemented with a relative large area that can be placed in the flame, and yet the cold junctions are maintained suitably below the temperature of the hot junction. It is accordingly another object of this invention to make it possible to transmit a greater quantity of heat selectively to the hot junction in spite of the fact that the thermocouple conductors are short.

The increased collecting area may for example, take the form of a sheath joined to the hot junction and heat insulated from the cold junctions. This collecting area supplementing the area of the actual hot junction also ensures steadiness in operation, without undesired fluctuations in power generated by the thermocouple, because of the heat capacity of the sheath and the fact that a large area of the sheath may be placed so as to be constantly within the flame without correspondingly elevating the temperature of the cold junctions. It is accordingly another object of this invention to provide a compact, inexpensive thermocouple that exhibits these desirable characteristics.

It is still another object of this invention to provide a thermocouple structure that can generate as much power as is usually encountered, in spite of the fact that the thermoelectric conductors are of small mass. This is accomplished by proper choice of relative cross sectional areas to length, whereby the power drain from the thermocouple is not unduly limited by the electrical characteristics of the thermocouple.

It is another object of this invention to provide a thermocouple structure that may be easily installed and without the necessity of critical choice of position with respect to the pilot flame.

It is still another object of this invention to make it possible to utilize short thermocouple conductors and yet to ensure that the cold junctions will not be subjected to the ambient temperature of the furnace chamber where the pilot burner is located.

It is still another object of this invention to ensure that the thermocouple will be rendered rapidly ineffective upon extinction of the pilot flame. This occurs because the sheath then serves rapidly to dissipate the heat from the hot junction, and because the mass of the thermocouple conductors is very small, with consequent reduction in the heat capacity of the structure.

It is another object of this invention to provide in general an improved and simplified thermocouple structure.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 shows an enlarged sectional view of a thermocouple structure embodying the invention, in association with a pilot flame burner;

Fig. 2 is an enlarged sectional view taken along plane 2—2 of Fig. 1; and

Fig. 3 is a fragmentary sectional view of a modified form of the invention, the scale being still further enlarged.

In the form illustrated in Figs. 1 and 2, the thermoelectric conductors 1 and 2 are shown as short rods. They may be placed side by side and may be made respectively of Chromel or Copel or other equivalent materials capable of producing thermoelectric effects. The conductors 1 and 2 are quite short, of the order of one-quarter of an inch.

The upper ends of the conductors 1 and 2 are shown as joined by a conducting member 3 which is in good thermal conducting relation with these conductors. For this purpose the member 3 may be in the form of a block of corrosion-resistant material, such as stainless steel or the like. This block may be provided with appropriate recesses 4 and 5 into which the upper ends of the conductors 1 and 2 are placed. In order to attach the member 3 to the conductors effectively, fusion or welding may be utilized, as illustrated at 6, showing fusion around the conductors where they extend out of the member 3.

The member 3, in conjunction with the upper ends of conductors 1 and 2, forms a hot thermocouple junction. The lower ends of the conductors 1 and 2 are shown as fused to the upper portions 7 and 8 of copper conductors 9 and 10, forming the "cold" junctions 12 and 13. The portions 7 and 8 are purposely reduced in cross section so as to reduce the total heat capacity adjacent the cold junctions.

A tubular sheath 11 is provided for the cold junctions. This sheath, as heretofore explained, is made to form a large heat collecting surface for the hot junction, and without influencing the cold junctions 12 and 13. This sheath extends downwardly and considerably beyond the cold junctions 12 and 13. It may be made of a stainless steel alloy. It may be securely joined to the member in order to facilitate transfer of heat between the sheath 11 and the member 3. For example, this may be accomplished by the aid of fusion or a weld as illustrated at 14. This member 3 is thus in close heat transfer relation with the inner surface of the tubular sheath 11.

To shield the cold junctions 12 and 13 as well as the leads 9 and 10 from heat, the hollow portion of the sheath 11 may be filled with good heat insulation material 15. This may be in the form of granular asbestos or porcelain or the like, tightly packed into the space around the conductors 1 and 2 and the leads 9 and 10.

The pilot burner 16 illustrated in Fig. 1 is intended to direct a pilot flame 17 against the hot junction of the thermocouple structure. This flame 17 plays also upon a large portion of the sheath 11. The sheath transmits the heat transferred to it from the flame 17 to the member 3, and thus to the hot junction. The intervening heat insulation material 15 prevents the heat of the sheath from materially affecting the cold junctions 12 and 13. Accordingly, in spite of the fact that the thermoelectric conductors 1 and 2 are quite short, a suitable temperature differential is readily maintainable between the exposed hot junction formed by the upper end of the thermocouple, and the cold junctions 12 and 13. Since the conductors 1 and 2 as well as the parts 7 and 8 of leads 9 and 10 are of small cross section with relation to the internal area of sheath 11, a considerable layer of heat insulation 15 may be used. There is thus no danger that the pilot flame 17 will deleteriously affect the temperature of the cold junctions, in spite of the fact that this flame plays directly on the sheath in the region where the sheath encloses the cold junctions 12 and 13. The sheath 11 may be extended downwardly to a region beyond the material influence of the flame 17. The leads 9 and 10 may be provided with a thin layer of insulation where they emerge from the sheath 11 for appropriate connection to control apparatus or the like.

In the form of the invention illustrated in Fig. 3, the junctions 12 and 13 and the leads 7 and 8 are formed substantially identically with that illustrated in Fig. 1. In this instance, however, a member 18 made from corrosion resistant material such as stainless steel, is utilized in place of the member 3 in Fig. 1. This member 18 may be provided with through apertures through which the upper ends of the conductors 1 and 2 extend. Good heat transfer is provided for between conductors 1 and 2 by fusion or welding 19 between the upper ends of the conductors 1 and 2, and the member 18; as well as between the periphery of member 18 and sheath 20.

The mode of operation is apparent from the foregoing. The flame 17, playing upon a major portion of the surface of sheath 11, directly transfers heat to the hot junction. This extensive heated area causes the device to be quite steady. At the same time, the cold junctions 12 and 13 is well protected against this heat by the heavy layer of insulation 15. Due to the small mass of the conductors 1 and 2, there is no material heat storage, and the hot junction is permitted to cool rapidly.

What is claimed is:

1. In a thermocouple structure, a pair of conductors made from dissimilar thermoelectric materials, and spaced side by side so that the end of one conductor is adjacent an end of the other conductor, a member thermally joining said ends, leads connected to the other ends, each of said leads having an enlarged cross section beyond the junction of the respective lead and conductor, and a sheath joined to said member, said sheath extending beyond the other ends of the conductors and surrounding the conductors, said sheath being in thermal relation to the member, and having a large heat absorbing surface adapted to be directly placed in a flame and capable of withstanding the temperature of the burner flame without deterioration.

2. In a thermocouple structure, a pair of conductors made from dissimilar thermoelectric materials, and spaced side by side so that the end of one conductor is adjacent an end of the other conductor, a member thermally joining said ends, leads connected to the other ends, each of said leads having an enlarged cross section beyond the junction of the respective lead and conductor, a sheath joined to said member and surrounding the conductors, and capable of withstanding the temperature of a burner flame without deterioration, said sheath being in thermal relation to the member, and extending for a substantial distance over those portions of the leads having enlarged sections, and heat insulation between the sheath and the conductors as well as between the sheath and the leads.

WILLIAM A. RAY.